(12) United States Patent
Lemelin et al.

(10) Patent No.: US 7,274,470 B2
(45) Date of Patent: Sep. 25, 2007

(54) OPTICAL 3D DIGITIZER WITH ENLARGED NO-AMBIGUITY ZONE

(75) Inventors: Guylain Lemelin, Ste-Foy (CA); Li Song, Boucherville (CA); Dominique Beauchamp, Lévis (CA); David Jacques, Beauport (CA); Patryck Rouleau, Québec (CA); Emmanuel Glasson, Sainte-Foy (CA); Patrick Dufour, Saint-Augustin-de-Desmaures (CA)

(73) Assignee: Inspeck Inc., Montreal (Quebec) (CA)

( * ) Notice: Subject to any disclaimer, the term of this patent is extended or adjusted under 35 U.S.C. 154(b) by 330 days.

(21) Appl. No.: 10/898,504

(22) Filed: Jul. 23, 2004

(65) Prior Publication Data

US 2005/0018209 A1 Jan. 27, 2005

(30) Foreign Application Priority Data

Jul. 24, 2003 (CA) .................................... 2435935

(51) Int. Cl.
*G01B 11/24* (2006.01)
(52) U.S. Cl. ...................... 356/604; 382/154
(58) Field of Classification Search ............... 356/603, 356/604; 382/154; 702/167
See application file for complete search history.

(56) References Cited

U.S. PATENT DOCUMENTS

| 6,493,095 B1 | 12/2002 | Song et al. ................. 356/603 |
| 6,664,531 B2 | 12/2003 | Gartner et al. |
| 7,103,212 B2 * | 9/2006 | Hager et al. ................ 382/154 |

* cited by examiner

*Primary Examiner*—Richard A. Rosenberger
(74) *Attorney, Agent, or Firm*—Knobbe Martens Olson & Bear LLP (57) ABSTRACT

An optical 3D digitizer with an enlarged non-ambiguity zone, comprising a structured light projector for projecting a fringe pattern over a target area, the fringe pattern having a shiftable position over the target area is disclosed. First and second cameras having overlapping measurement fields are directed toward the target area and positioned with respect to the projector to define distinct triangulation planes therewith. The second camera has a larger non-ambiguity depth than the first camera. A computer evaluates a same set of camera-projector related functions from images captured by the cameras including the projected pattern at shifted positions, builds low depth resolution and degenerated 3D models from the camera-projector related functions evaluated with respect to the second and first cameras respectively, determines chromatic texture from the images, and builds a complete textured 3D model from data corresponding between the low depth resolution and degenerated 3D models within a tolerance range.

15 Claims, 8 Drawing Sheets

OPTICAL 3D DIGITIZER WITH ENLARGED NO-AMBIGUITY ZONE

BACKGROUND OF INVENTION

1. Field of the Invention

The present invention relates to an optical 3D digitizer with an enlarged non-ambiguity zone, having various applications for example in the field of color non-contact optical 3D digitization, computer assisted 3D vision, human body digitizing, computer animation and computer graphics, electronic games, 3D electronic archiving, 3D web, reverse engineering and 3D medical imaging.

2. Description of the Related Technology 3D digitizing, particularly non-contact optical 3D digitizing techniques, have become commercially available during recent years. Most of these techniques are based on the principle of optical triangulation. Despite the fact that passive optical triangulation (stereo vision) has been studied and used for many years for photogrammetric measurements, the active optical triangulation technique (particularly laser scanning technique) has gained popularity because of its robustness and simplicity to process data obtained using a computer. Most of the systems based on the active optical triangulation principle were developed for industrial applications, such as robotic assembly, robot guidance, industrial inspection, reverse engineering, etc.

As an example of such technique, a laser beam or a laser stripe is projected on a 3D surface of an object, scattering the laser beam or laser stripe on the surface. It is measured using a photo-electronic device. A signal can be generated indicating the position (usually the depth) of the measured point. In most cases, the basic measurements are either a point or a section profile. A mechanical or optical scanning device is usually used to provide a frame of 3D measurement. For industrial applications, mechanical scanning can be accomplished by the mechanism on which the digitizing device is mounted, such as a robot or a conveyer. The scanning process consists of a sequential data acquisition process and takes relatively longer time to scan a surface. During the scanning, the object should be kept immobilized; this is a major problem when scanning a live being. Different techniques, such as the projection of multiple stripes, laser line scanning during one video frame and high speed scanning, have been developed. These approaches are either too expensive to realize, or their sampling rate is still too low compared to 2D digital imaging.

A laser beam is a monochromatic light source. One single monochromatic laser beam cannot provide full color information of the measured surface. On the other hand, a number of today's 3D applications including computer animation, electronic games, 3D Web, 3D archiving and 3D medical imaging require information on color texture which contributes to most of the visual effects. In order to measure the color texture of a surface, a 3D digitizing system based on a laser scanning principle has to use multiple laser sources (blue, green and red lasers) or use a second camera to get color data. The first solution is very difficult to be implemented and is also very expensive. The second can suffer from problems of misalignment between 3D geometric data and color texture data because they are not captured from the same angle of the view.

Other active optical 3D digitizing techniques are based on structured light projection (pattern coding, moiré or interferometry) or random pattern projection (active stereogrammetry). For all these active optical 3D digitizing techniques, the measurement space is limited by the intersection of the usable light projection coverage (field of view and depth of field) and the usable viewing coverage (field of view and depth of field of at least one optical sensor). If the light projection pattern is periodic, the non-ambiguity zone is limited by the triangulation angle and the period. Different tricks may be used for removing the light projection pattern and get a colored texture image of the measured object. In that case, the same optical sensor may be used for measuring the 3D information and the texture of the surface of the subject, with a unique relation.

An active optical 3D digitizing technique is described in U.S. Pat. No. 6,493,095 (Song et al.). Even if this state of the art technique gives impressive results, it is still limited by the encoding points in the light projection pattern and its non-ambiguity zone that is typically much smaller than the depth of field. That may lead to partial or complete discontinuity in the unwrapped phase function if the surface of the subject (3D object) is not continuous. In most cases, a trained user can overcome these limitations; but it is difficult to get an optical 3D digitizer easy to use or even completely automated for any type of subject.

Summary of Certain Inventive Aspects of the Invention

One aspect of the invention is to provide an optical 3D digitizer having an enlarged non-ambiguity zone.

Another aspect of the invention is to provide an optical 3D digitizer having nice features of light projection moiré interferometry combined to an automatic order function determination, leading to a precise, simple to use and cost-effective optical 3D digitizer.

Another aspect of the invention is to provide an optical 3D digitizer which no longer requires encoding projected lighting with information related to absolute positions in the image.

According to one aspect of the present invention, there is provided an optical 3D digitizer with an enlarged non-ambiguity zone, comprising: at least one structured light projector for projecting a fringe pattern over a target area, the fringe pattern having a shiftable position over the target area; a first camera directed toward the target area and positioned with respect to said at least one structured light projector to define a first triangulation plane therewith; a second camera directed toward the target area and positioned with respect to said at least one structured light projector to define a second triangulation plane therewith, the second triangulation plane being distinct from the first triangulation plane, the first and second cameras having at least partially overlapping measurement fields, the second camera having a larger non-ambiguity depth than the first camera; and a computer means connected to the cameras, for performing an image processing of images captured by the cameras, the image processing including evaluating a same set of camera-projector related functions from images including the pattern projected by said at least one structured light projector at shifted positions as captured by the cameras, building a low depth resolution 3D model from the camera-projector related functions evaluated with respect to the second camera, building a degenerated 3D model from the camera-projector related functions evaluated with respect to the first camera, determining chromatic texture from the images captured by the cameras, and building a complete textured 3D model from data corresponding between the low depth resolution and degenerated 3D models within a tolerance range.

According to another aspect of the present invention, there is also provided an optical 3D digitizing method with an enlarged non-ambiguity zone, comprising: controllably projecting a fringe pattern over a target area using at least one structured light projector, the fringe pattern having a shiftable position over the target area; positioning a first camera directed toward the target area with respect to said at least one structured light projector to define a first triangulation plane therewith; positioning a second camera directed toward the target area with respect to said at least one structured light projector to define a second triangulation plane therewith, the second triangulation plane being distinct from the first triangulation plane, the first and second cameras having at least partially overlapping measurement fields, the second camera having a larger non-ambiguity depth than the first camera; and performing an image processing of images captured by the cameras, the image processing including evaluating a same set of camera-projector related functions from images including the pattern projected by said at least one structured light projector at shifted positions as captured by the cameras, building a low depth resolution 3D model from the camera-projector related functions evaluated with respect to the second camera, building a degenerated 3D model from the camera-projector related functions evaluated with respect to the first camera, determining chromatic texture from the images captured by the cameras, and building a complete textured 3D model from data corresponding between the low depth resolution and degenerated 3D models within a tolerance range.

According to another aspect of the present invention, there is also provided a computer apparatus for performing an image processing of images captured by first and second cameras, the second camera having a larger non-ambiguity depth than the first camera, comprising: means for evaluating a same set of camera-projector related functions from images captured by the cameras, at least some of the images including a pattern projected at shifted positions; means for building a low depth resolution 3D model from the camera-projector related functions evaluated with respect to the second camera; means for building a degenerated 3D model from the camera-projector related functions evaluated with respect to the first camera; means for determining chromatic texture from the images captured by the cameras; and means for building a complete textured 3D model from data corresponding between the low depth resolution and degenerated 3D models within a tolerance range.

According to another aspect of the present invention, there is also provided a computer readable medium having recorded thereon statements and instructions for execution by a computer to perform an image processing of images captured by first and second cameras directed toward a target area, the second camera having a larger non-ambiguity depth than the first camera, the image processing including evaluating a same set of camera-projector related functions from the images captured by the cameras, at least some of the images including a pattern projected at shifted positions, building a low depth resolution 3D model from the camera-projector related functions evaluated with respect to the second camera, building a degenerated 3D model from the camera-projector related functions evaluated with respect to the first camera, determining chromatic texture from the images captured by the cameras, and building a complete textured 3D model from data corresponding between the low depth resolution and degenerated 3D models within a tolerance range.

According to another aspect of the present invention, there is also provided a computer program product, comprising a memory having computer readable code embodied therein, for execution by a CPU, for performing an image processing of images captured by first and second cameras directed toward a target area, the second camera having a larger non-ambiguity depth than the first camera, said code comprising: code means for evaluating a same set of camera-projector related functions from the images captured by the cameras, at least some of the images including a pattern projected at shifted positions; code means for building a low depth resolution 3D model from the camera-projector related functions evaluated with respect to the second camera; code means for building a degenerated 3D model from the camera-projector related functions evaluated with respect to the first camera; code means for determining chromatic texture from the images captured by the cameras; and code means for building a complete textured 3D model from data corresponding between the low depth resolution and degenerated 3D models within a tolerance range.

According to another aspect of the present invention, there is also provided a carrier wave embodying a computer data signal representing sequences of statements and instructions which, when executed by a processor, cause the processor to perform an image processing of images captured by first and second cameras directed toward a target area, the second camera having a larger non-ambiguity depth than the first camera, the statements and instructions comprising: evaluating a same set of camera-projector related functions from the images captured by the cameras, at least some of the images including a pattern projected at shifted positions; building a low depth resolution 3D model from the camera-projector related functions evaluated with respect to the second camera; building a degenerated 3D model from the camera-projector related functions evaluated with respect to the first camera; determining chromatic texture from the images captured by the cameras; and building a complete textured 3D model from data corresponding between the low depth resolution and degenerated 3D models within a tolerance range.

According to another aspect of the present invention, there is also provided an optical 3D digitizing method with an enlarged non-ambiguity zone, comprising: controllably projecting a fringe pattern having a shiftable position over a target area; capturing images obtained by high depth resolution sensing and low depth resolution sensing from respective measurement fields at least partially overlapping each other over the target area; determining absolute pixel 3D positions in the images obtained by low depth resolution sensing and high depth resolution sensing as a function of relations depending on the fringe pattern in the captured images and correspondence between the absolute pixel 3D positions in the images; extracting chromatic texture from the captured images; and building a complete textured 3D model from the absolute pixel 3D positions and the chromatic texture.

The following provides a non-restrictive outline of certain possibly preferably features of the invention which will be more fully described hereinafter.

The optical 3D digitizer may consist of two color (color version) or monochromatic (B/W version) cameras and a light projection system. Each camera-projector couple is defined by a triangulation plane and a usable coverage (field of view and depth of field). The two couples of camera-projector increase the mathematical constrains and remove the ambiguity of a periodicity of a phase function by evaluating an order function. That leads to an optical 3D digitizing apparatus with a composed non-ambiguity zone extended to fill the entire usable coverage (field of view and depth of field).

A possible configuration is based on two (or more) synchronized cameras and one white light projected pattern, defining two optical triangulation planes. The two planes may be coplanar or show a defined relative angle, and their respective usable coverage are overlapping. The two baselines, the angle between the triangulation planes and the orientation of the projected pattern, allow adjustment of two different depth sensitivities and non-ambiguity zones. It is then possible to get a low sensitivity camera-projector couple with a large non-ambiguity zone for the full usable coverage, and a high sensitivity camera-projector couple with a small non-ambiguity zone leading to multiple orders in its phase function, thus giving a higher resolution for the depth. If the two optical triangulation planes are not coplanar, it is easy with a slight tilt of a projection fringe pattern to get a ratio of non-ambiguity depth greater than ten. Correspondence between the two cameras is defined by the configuration and represented by a look-up table (LUT). Once the phase and order functions are evaluated for all the cameras, a 3D model can be automatically constructed using a LUT. An optical device may be used to remove the structures in the projected pattern leading to homogeneous white lighting. This lighting or other external lighting may be used for measuring the colored (or chromatic) texture of a subject, with the same cameras. The colored texture is then naturally and exactly mapped onto the 3D model. It is also possible to evaluate the color information of the subject from the images containing the projected pattern. The 3D information and generated texture can be extracted using mathematical functions (such as the phase, phase shift, average and modulation functions) for one or multiple projected pattern images of the subject, as seen by the cameras. All these functions are defined for every pixel, leading to the highest possible resolution. Using synchronized cameras allows reaching the shortest acquisition time for the 3D digitizing device as if there were only one camera. The overall acquisition time will be a fraction of a second with commercially available standard cameras: such an acquisition time is critical for efficient 3D digitizing, especially for living subject.

Each of the camera-projector couple has the capacity of measuring many mathematical functions for every individual pixels of the camera. By analyzing these functions for all of the camera's overlapped fields of view (such as the phase, phase shift, average and modulation functions), it is possible to increase the non-ambiguity zone, up to cover all the effective measurement volume. The number of image pixels captured by each camera is limited either by industrial standards (for example, NTSC or PAL) or by the manufacturing cost of the camera. This limitation does not apply to the projected pattern. In fact, the only limit for a projected pattern (a film, for example) is the optical resolution of the film and projection optics. It is not uncommon to obtain a resolution of 50 to 100 lines per mm on a pattern to be projected, which may have a size of 35 mm×25 mm. So it is evident that one projected pattern can easily provide the necessary image information for the area covered by at least two cameras.

One approach for 3D coordinate measurements may use one video frame containing a projected fringe pattern. Another approach may require a few video images, which also contain a projected fringe pattern. An image processing based on analysis of mechanical interference pattern provides the 3D coordinate data for each image pixel. So one or more combined images are required to provide 3D measurement of one view of a subject. The acquisition time of one view requires a fraction of a second using commercially available standard cameras. The necessary acquisition time of the digitizer is much shorter than most of existing techniques based on laser scanning principles. Also, many more data points can be measured on a living 3D object who does not need special training to be kept immobilized for several seconds.

The cameras used for the measurement of 3D geometry may provide directly the capturing of color or gray scale texture. In order to ensure a uniform illumination during the capturing of texture, a defocusing optical element which removes the fringe pattern from the image may be used. Another possibility is to block the projected light and use the surrounding or auxiliary lighting for the acquisition of the texture image. It is also possible to evaluate the texture image from known algorithm related to the fringe images. In all these cases, since the same image pixel of the camera measures the 3D geometry and texture data of a point on a 3D surface, the texturing mapping on top of 3D geometry is automatically ensured by the nature of this data acquisition. The 3D digitizer does not need two image sensors to separately measure 3D geometry and texture and avoids the problem of misalignment occurring with laser scanning systems.

The data of 3D coordinates obtained from at least one camera is preferably calibrated in an orthonormal coordinate space. An analysis using the mathematical functions from all the cameras (such as the phase, phase shift, average and modulation functions) allows determination of the order of the phase function for at least one camera. The result is at least one fully textured and accurate 3D model ready to use. The relationship between all these mathematical functions may be defined experimentally during a calibration process that is performed under known conditions. This relationship ensures the conversion of the measurement in computer unit to real physical parameters for the whole surface of the subject to measure in 3D.

BRIEF DESCRIPTION OF THE DRAWINGS

A detailed description of preferred embodiments will be given herein below with reference to the following drawings, in which like numbers refer to like elements.

DETAILED DESCRIPTION OF CERTAIN EMBODIMENTS OF THE INVENTION

As used in connection with this disclosure, the expression "chromatic texture" refers to variations of shade in a black and white image and to variations of color in a color image.

As used in connection with this disclosure, the expression "triangulation plane" refers to a composition of a baseline corresponding to a distance between a camera and a projector, and an angle between an optical axis of the camera and an optical axis of the projector. It does not represent an infinite plane but rather a plane limited by an overlap of the fields covered by the camera and the projector.

Figure 1A:
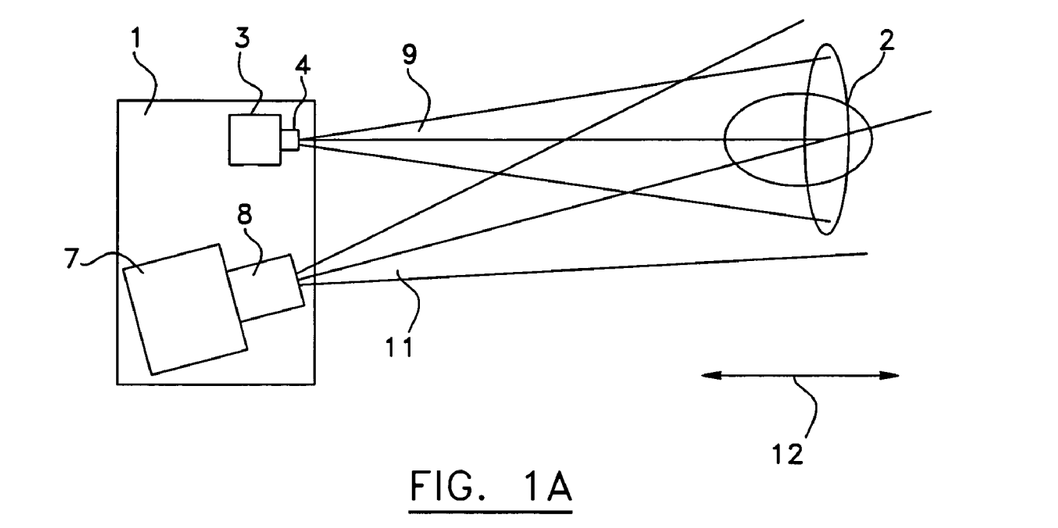
FIGS. 1A and 1B are top and side schematic views of a digitizer.
Figure 1B:
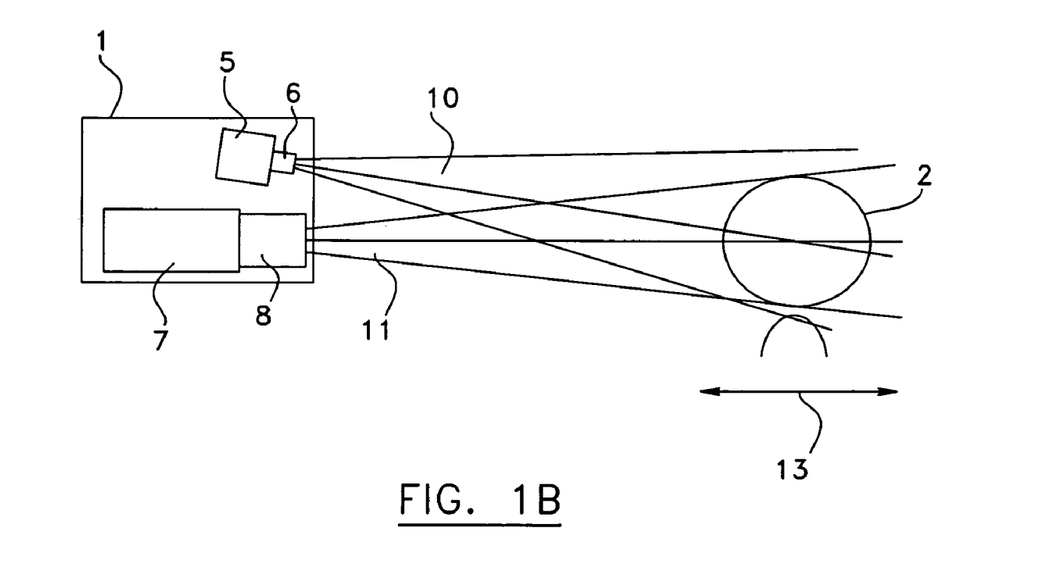

Referring to FIGS. 1A and 1B, there is shown an optical 3D digitizer 1 and a subject 2 to be digitized, positioned in a target zone. The digitizer has a first camera 3 with lens 4 (as shown in FIG. 1A), a second camera 5 with lens 6 (as shown in FIG. 1B), and a white light projector 7 with projection lens 8 for white light pattern projection 11. The first camera 3 has a field of view 9 and a depth of measurement 12, while the second camera 5 has a field of view 10 and a depth of measurement 13.

Figure 2:
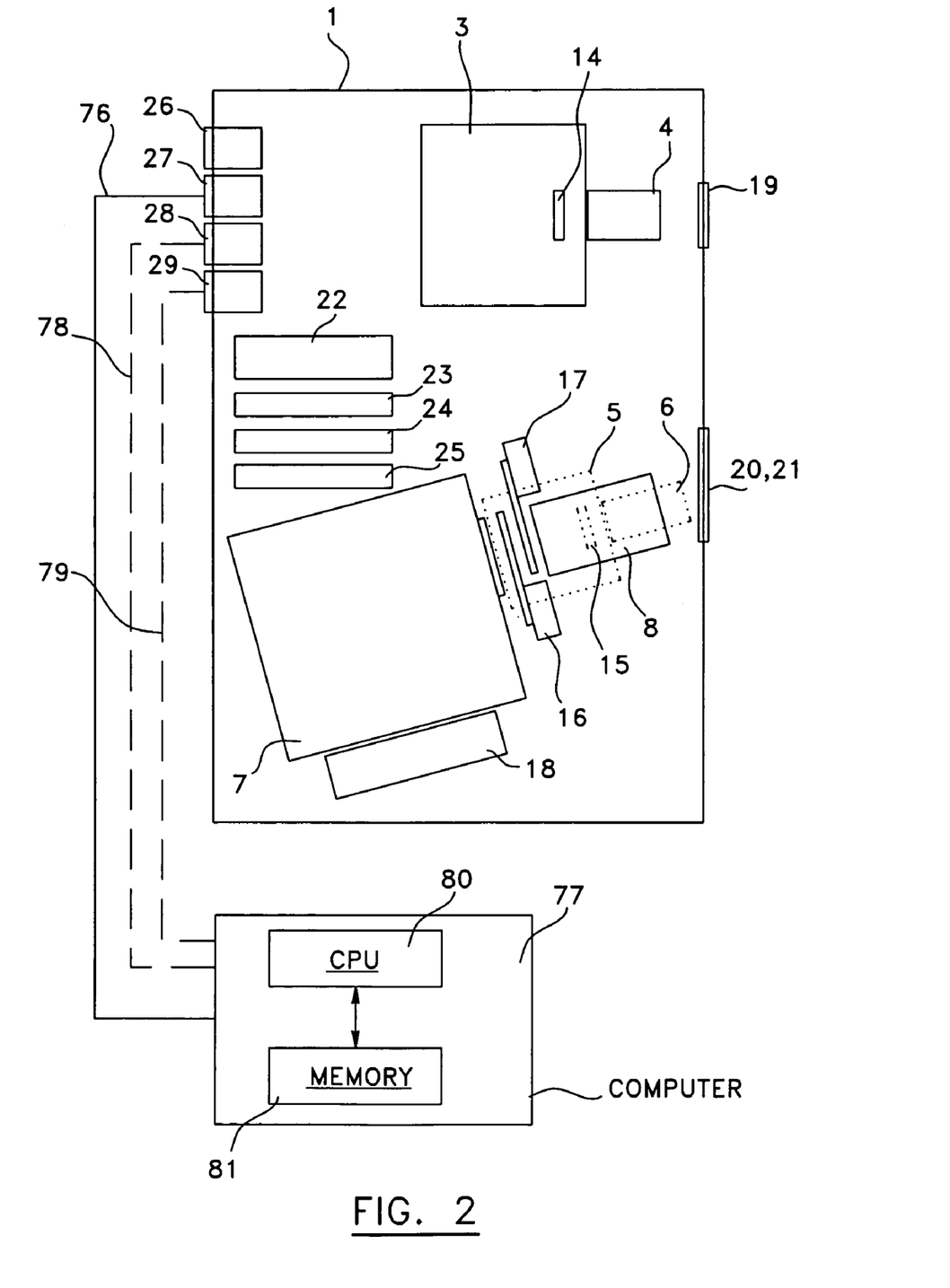
FIG. 2 is a schematic diagram of main parts of a digitizer.
Figure 3A:
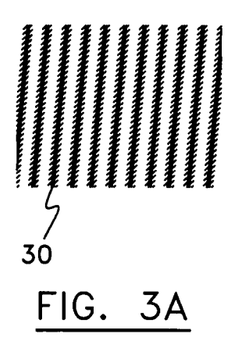
FIGS. 3A-3D are schematic diagrams illustrating an example of a projected pattern at different positions.
Figure 3B:
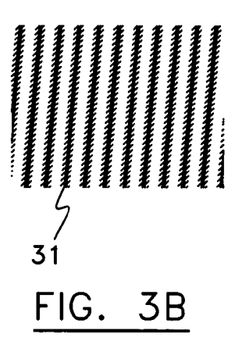
Figure 3C:
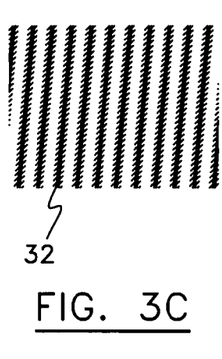
Figure 3D:
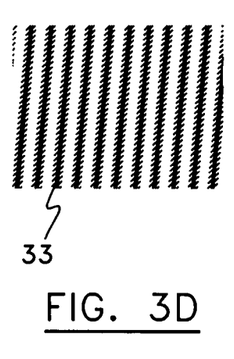

Referring to FIG. 2, the first camera 3 has a 2D sensor 14 and the second camera 5 has a 2D sensor 15 (over the projection system). A pattern 30, 31, 32, 33 with periodic sinusoidal fringes as shown in FIGS. 3A-3D is illuminated by the white light source projector 7, and projected by the projection lens 8 on the subject 2. A cooling device 18 may be used to keep the digitizing system at an accepted temperature when necessary. The patterns 30, 31, 32, 33, which will be deformed due to a relief of the subject 2, is captured by the cameras 3, 5 through lenses 4, 6. Some overlap should be kept between the two fields 9, 10 covered by the cameras 3, 5. The cameras 3, 5 may be powered by a power supply 22. The video signals are sent to a capturing board (for example a frame grabber board, a Firewire port or USB2 port—not shown in the figures) in a PC computer by a video cable 76 connected to the connector 27 (or multiple video cables connected to connectors if necessary). A number of patterns can by captured for different pattern positions as depicted by the patterns 30, 31, 32, 33 shown in FIGS. 3A-3D, obtained by shifting the projected pattern with a shifting device 16. The shifting of pattern and illumination lighting may be controlled via a main control board 23 by a PC computer 77 through a cable 78 connected to a connector 28. A dimmer control device 29 may also control the intensity of the lighting. A defocusing and shutter device 17 driven by the main control board 23 may be used to provide different functions of the image acquisition. The digitizer 1 may be provided with optical windows 19, 20 for the cameras 3, 5, and an optical window 21 for the projector 7.

Figure 4:
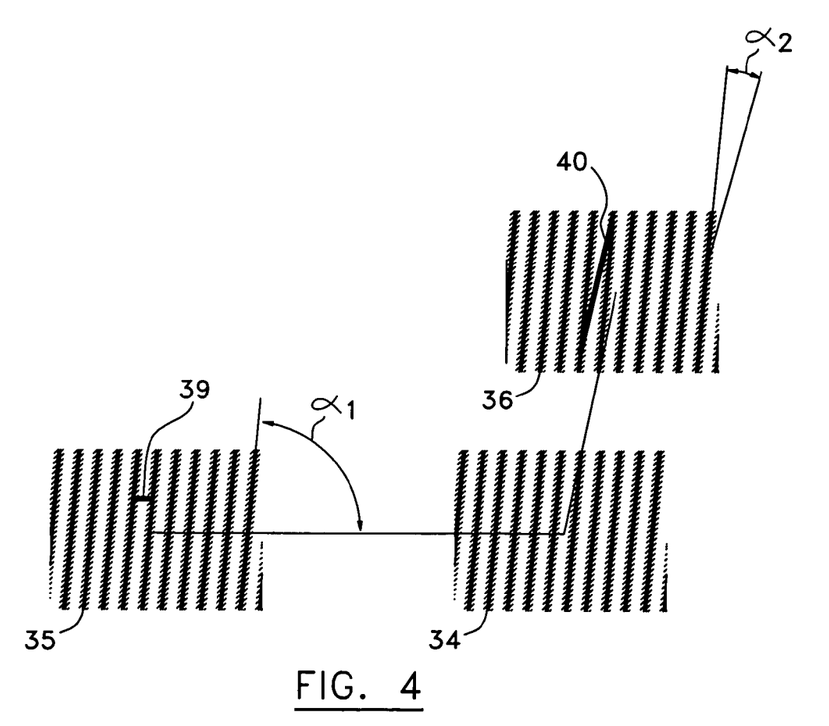
FIG. 4 is a schematic diagram illustrating effective pitch of a projected pattern for different triangulation planes.

Referring to FIG. 4, there is shown an effective pitch of the projected pattern for different triangulation planes. The structured projection pattern 34 is imaged as depicted by pattern 35 by the first camera 3, and is imaged as depicted by pattern 36 by the second camera 5. $\alpha_1$ represents the angle of the pattern 35 from the triangulation plane with respect to the first camera 3 while $\alpha_2$ represents the angle of the pattern 36 from the triangulation plane with respect to the second camera 5. Line 39 represents the effective pitch of the structured projection pattern 35 for the first camera 3, and line 40 represents the effective pitch of the structured projection pattern 36 for the second camera 5.

Figure 5:
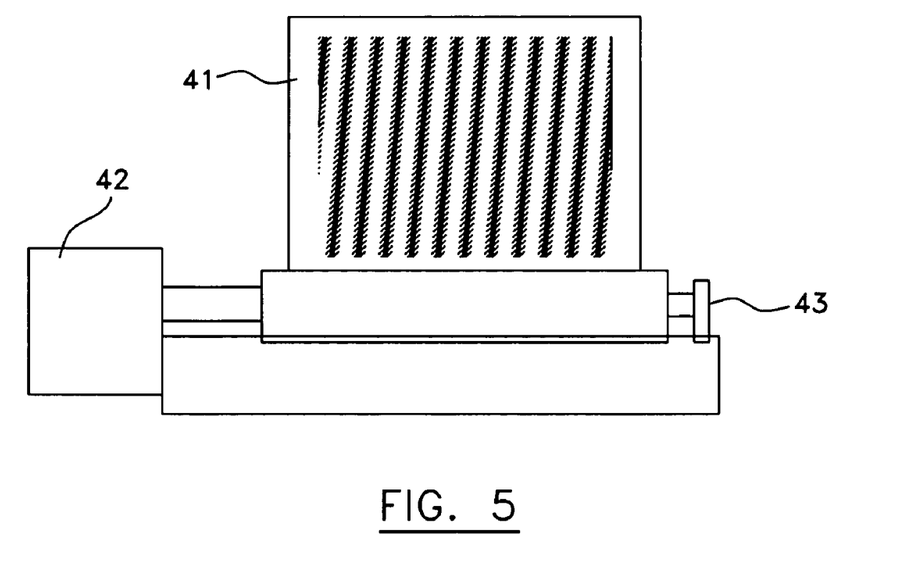
FIG. 5 is a schematic diagram of a pattern shifting device.

Referring to FIG. 5, the shifting device 16 may consist of a grating element 41 mounted onto a motorized translation stage 42 monitored by a position switch 43.

Figure 6:
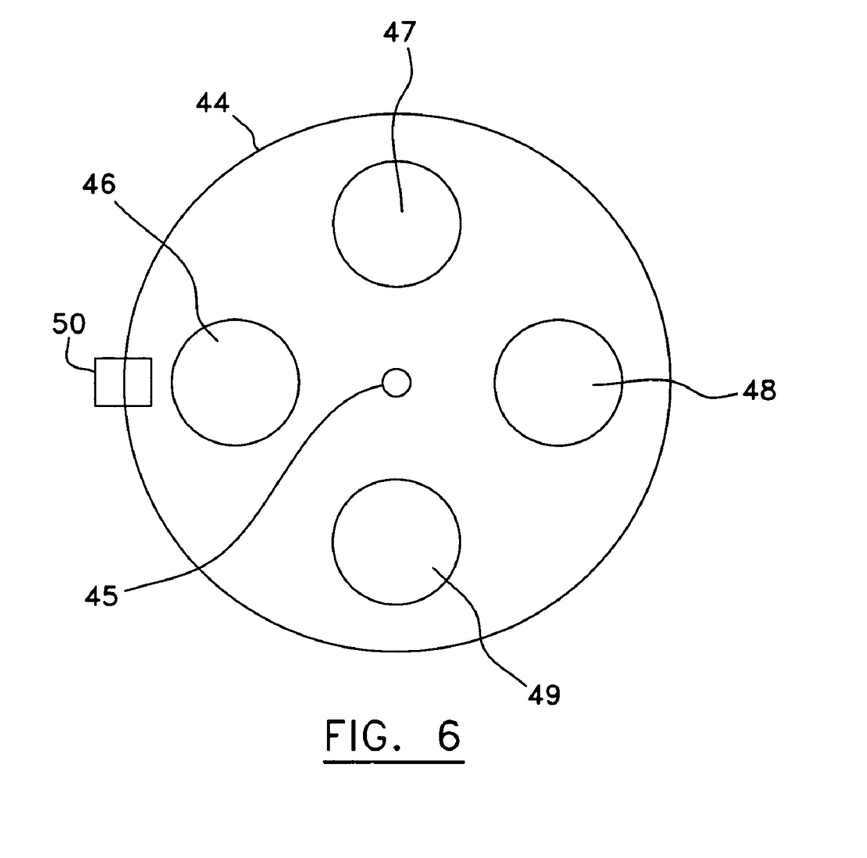
FIG. 6 is a schematic diagram of a defocusing and shutter device.

Referring to FIG. 6, the defocusing and shutter device 17 may consist of a rotating wheel 44 fastened to a motor shaft 45 and monitored by a position switch 50. The rotating wheel 44 has a closed aperture 46 (e.g. shutter position 1), an opened (clear) aperture 47, a defocusing lens 48, and a closed aperture 49 (e.g. shutter position 2).

Referring back to FIG. 2, the 3D digitizer 1 uses two distinct optical triangulation planes to enlarge the non-ambiguity zone. A first optical triangulation plane is defined by the first camera 3 and the projection system 7, and a second optical triangulation plane is defined by the second camera 5 and the projection system 7. The two optical triangulation planes are not coplanar and show different baselines, optimizing the respective non-ambiguity depth difference. For example, if the fringe pattern 34 is slanted by few degrees, being almost perpendicular to the second optical triangulation plane, the ratio of non-ambiguity depth can easily exceed 10. The equivalent wavelength (or non-ambiguity depth) is approximated by:

$$\lambda \approx (MP)/\sin(\theta) \quad (1)$$

where M is a magnification factor of the projection lens 8, P (pitch) is a distance between two periodic fringes on the pattern 34, and $\theta$ is an angle between the projection's optical axis and the camera's optical axis. If $\alpha$ is an angle between the fringe pattern 34 and the optical triangulation plane (see FIG. 4), the respective pitches are:

$$P_1 = P/\sin(\alpha_1) \quad (2a)$$

$$P_2 = P/\sin(\alpha_2) \quad (2b)$$

Figure 7A:
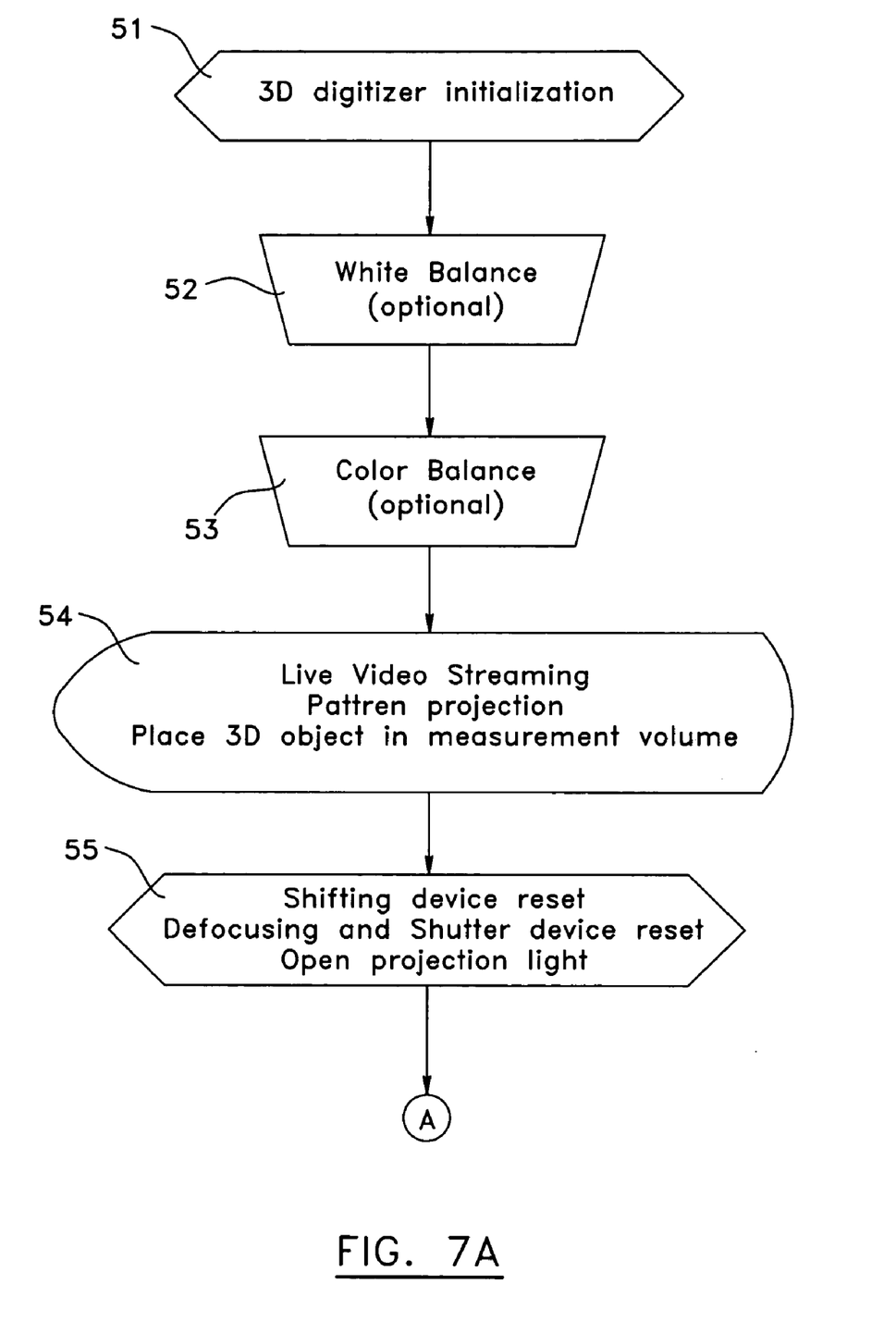
FIGS. 7A and 7B are a flow chart illustrating an acquisition process.
Figure 7B:
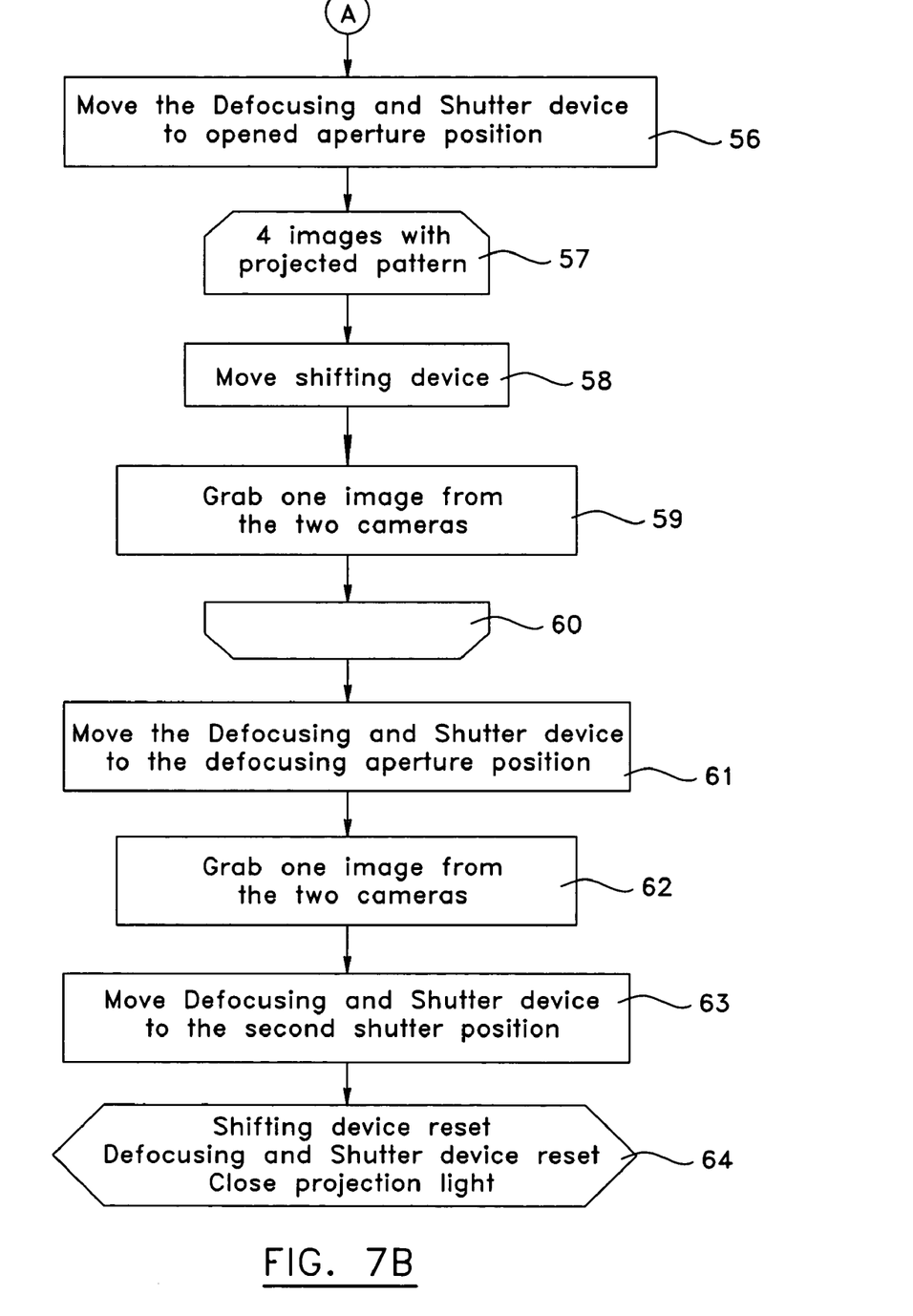

Referring to FIGS. 2 and 7, the 3D digitizer 1 may use the following sequence during 3D data acquisition of a 3D object, the subject to digitize. Upon startup, the 3D digitizer 1 is reset as depicted by block 51 (it may also be reset on demand by software control). The reset function allows to prepare the 3D digitizer 1 for an acquisition with known position for the shifting device 16 and the defocusing and shutter device 17. All the functions of the shifting device 16 and defocusing and shutter device 17 may be provided through the main control board 23 and a motor controller 24. A projection light controller 25 allows to open or close the lamp of the projector 7, and to control the light intensity by controlling the voltage of the lamp. Upon startup of the 3D digitizer 1, the projection lamp controller 25 analyses the input voltage from a power entry 26 of the digitizer 1, and reduces the maximum lamp voltage to get a fixed maximum power for the projection lamp. The projection light intensity may be controlled using a dimmer device 29 or by software, e.g. through line 79 connecting the dimmer device 29 to the computer 77. The main control board 23 receives a request from the computer 77 through the cable 78 connected to the control connector 28, performs the requested operation over the motor control board 24, projection light control board 25, cameras 3 and 5 or send back the status of the controllers 23, 24, 25 and the switches 43, 50. The main control board 23, motor control board 24, projection light control board 25, motors (not shown) e.g. in the shifting device 16 and the defocusing and shutter device 17, and cameras, may all be powered by a power supply and voltage regulating device 22 (or multiple ones if desired). Once the 3D digitizer 1 is ready for operation, the user adjusts the surrounding lighting to optimize the 3D acquisition using optional auxiliary lighting (not shown). To ensure the best use of the dynamic range of the cameras 3, 5, a white balance process as depicted by block 52 may be achieved using the current lighting and the projected light of the 3D digitizer 1. The white balance parameters can be measured using a white balance target or keeping the factory default that was measured during a calibration step (e.g. in the fabrication process). If multiple 3D digitizers 1 are used in a same setup, a color balance process as depicted by block 53 allows to get a better match of the color for all the cameras. Again, a color balance target may be used or the factory default may be kept instead. The software executed by the computer 77 provides multiple functions for controlling the acquisition and processing of data. The use of the 3D digitizer 1 may be performed with a software control interface as depicted by block 54 that allows to show a live video stream of images of the cameras 3, 5 of the 3D digitizer 1, the projection system control (projecting the fringe pattern 34 (shown in FIG. 4) with aperture selection of the defocusing and shutter device 17), the adjustment of the cameras 3, 5 (either mechanical iris or control of integration time of the sensors 14, 15), image grabbing and launch of the acquisition sequence. The 3D object 2 (shown in FIGS. 1A-1B) is placed in the virtual measurement volume or target zone of the 3D digitizer 1. The software control interface 54 allows the user to adjust the parameters for optimizing the 3D acquisition sequence using the projected fringe pattern 34 and the light condition for the colored texture. Once the parameters are all set for the 3D acquisition sequence, it may be launched using a button (not shown) in the software control interface 54. As shown in Table 1 below, the 3D acquisition sequence may perform the following tasks, for example with 4 phase-shifted fringe images and texture.

TABLE I reset of the shifting device 16 (block 55)
reset of the defocusing and shutter device 17 (block 55)
switching on of the projector 7 (block 55)
projection of the first position 30 of fringe pattern 34 with shutter position 46 (block 55)
moving of the shutter device 17 to aperture position 47 (block 56): the fringe pattern 34 is now projected onto the 3D object 2
capturing of four images with the projected pattern (looping procedure depicted by blocks 57 (begin) and 60 (end))
grabbing of one image from the two cameras 3, 5 (block 59)
moving of the shifting device 16 to the second shifted position 31 (block 58)
grabbing of one image from the two cameras 3, 5 (block 59)
moving of the shifting device 16 to the third shifted position 32 (block 58)
grabbing of one image from the two cameras 3, 5 (block 59)
moving of the shifting device 6 to the fourth shifted position 33 (block 58)
grabbing one image from the two cameras 3, 5 (block 59)
moving of the shutter device 17 to the defocusing position 48 (block 61)
grabbing of one image from the two cameras 3, 5 (block 62)
moving of the shutter device 17 to the shutter position 49 (block 63)
reset of the shifting device 16 and of the defocusing and shutter device 17 (block 64)
switching off of the projector 7 (block 64)

Using commercially available cameras, the overall sequence as depicted by blocks 55 to 64 may take less than a second. The sequence of camera's images, acquisition parameters and 3D digitizer parameters may be kept as a data set in the memory of the computer 77 in a specialized structure and saved on a disk for later processing.

Figure 8A:
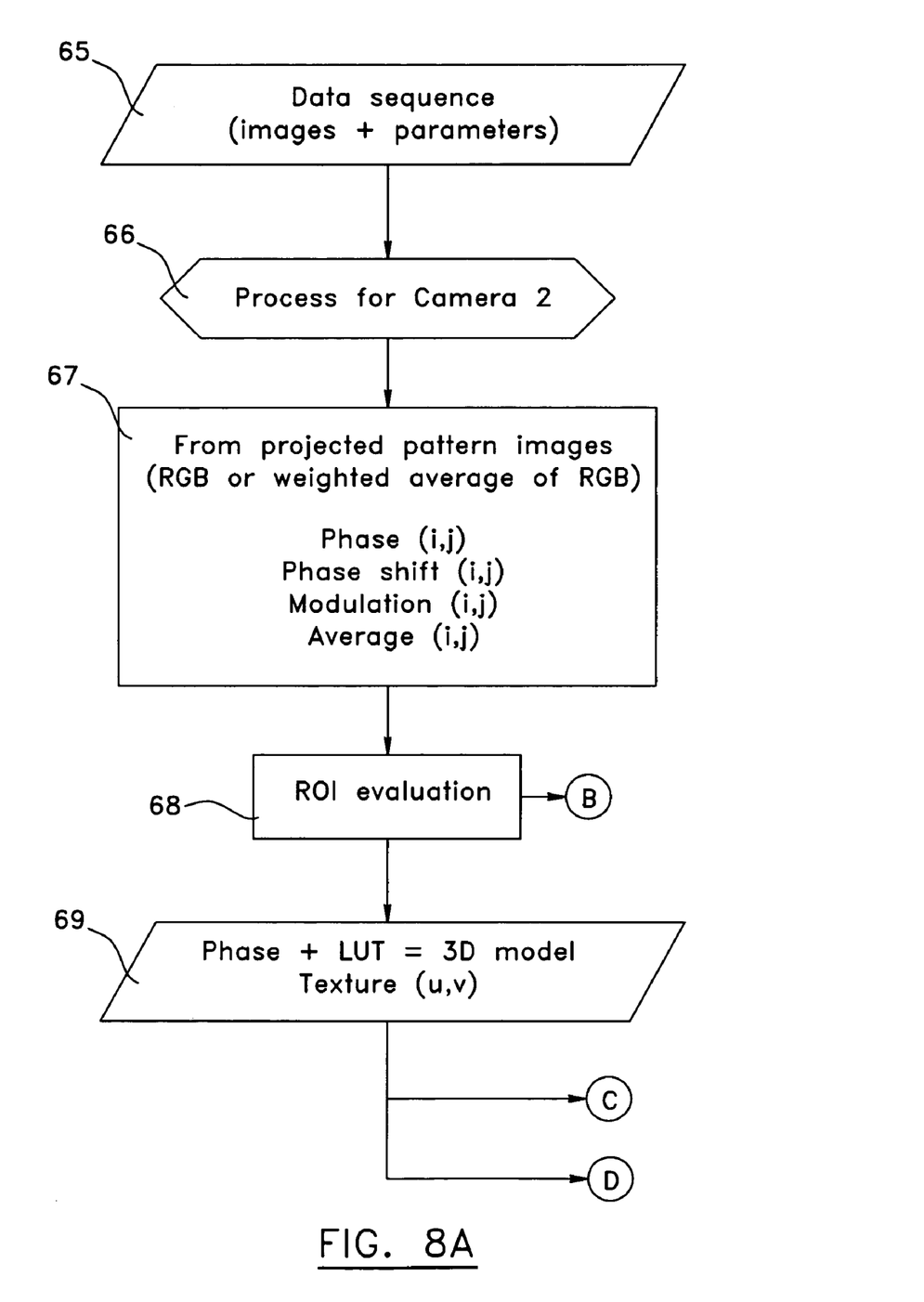
FIGS. 8A and 8B are a flow chart illustrating a textured 3D model extraction process.
Figure 8B:
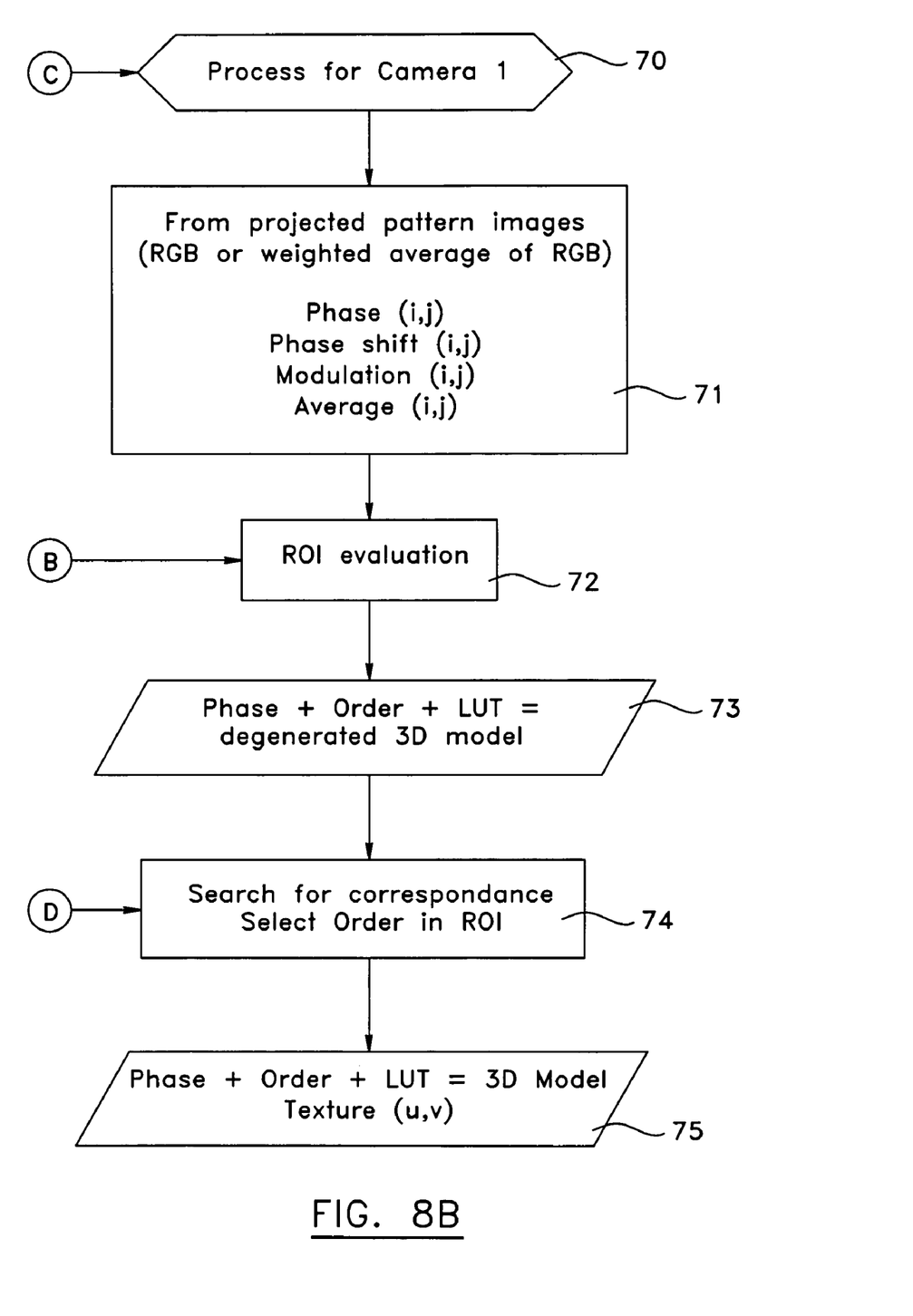

Referring to FIG. 8, once the 3D acquisition is done, the data set as depicted by block 65 can be processed for extracting the textured 3D model as depicted by block 75 (single view). The software executed by the computer 77 may use the data sequence already in memory or load the data saved on a disk for performing the image processing. Beginning with the second camera 5 as depicted by block 66 and then with the first camera 3 as depicted by block 70, a set of relations as depicted by blocks 67 and 71 are defined for every pixel of both cameras 3, 5 used during the 3D acquisition sequence, from phase shifting algorithms well known in phase shifting interferometry. These mathematical functions include the phase function, the phase shift function, the amplitude modulation function and the average function: all these functions can be evaluated for every pixel, either from separate color channels or luminance (grey scale or weighted average of color channels). It is also possible to use spatial phase shifting algorithms that rely on a single fringe image instead of multiple fringe images in the temporal phase shifting interferometry (current example). The color of the 3D object can be evaluated from the amplitude modulation function and the average function using separate color channels. If a separate image is measured for the texture, a set of (u, v) coordinates creates the natural link between the 3D model and the colored texture image. The mathematical functions (blocks 67 and 71) for the current example use four frames with a phase shift of 90 degrees. The images captured by a camera with fringes projected on the subject can be written as:

$$I_n(i,j)=I_{Ave}(i,j)+I_{Mod}(i,j)[1+\cos(\phi(i,j)+m(i,j)2\pi+(n-1)\alpha)]$$

where I represents one of the images, n represents a shift position of the pattern, i,j represent pixel coordinates in said one of the images, $I_{Ave}$ (i,j) represents a local intensity diffused or reflected back to the camera which captured the image under consideration, including surrounding ambient light and local temporal average intensity of the projected pattern, $I_{Mod}$ (i,j) represents a local amplitude modulation of the projected pattern, $\phi(i, j)$ represents a local phase function wrapped over $2\pi$ range, m(i,j) represents a local order of the phase function, and a represents a 90° phase shift. These relations are quite general and could be extended or modified to fulfil almost any phase shifting interferometry algorithm, either for separate RGB channels or the corresponding average or luminance (weighted average). From these equations alone, the local order m(i,j) cannot be evaluated, but all the other functions may be evaluated using:

$$\phi(i,j)=inv\tan((I_4(i,j)-I_2(i,j))/(I_1(i,j)-I_3(i,j)))$$

$$I_{Mod}(i,j)=\sqrt{(I_1(i,j)-I_3(i,j))^2+(I_4(i,j)-I_2(i,j))^2}$$

$$I_{Ave}(i,j)=(I_1(i,j)+I_2(i,j)+I_3(i,j)+I_4(i,j))/4$$

Using a Carré algorithm, the phase shift $\alpha$ can also be evaluated for quality assessment of the data:

$$\alpha(i,j) = 2 \cdot inv\tan\left(\sqrt{\frac{3(I_2(i,j)-I_3(i,j)-I_1(i,j)-I_4(i,j))}{(I_2(i,j)-I_3(i,j)+I_1(i,j)-I_4(i,j))}}\right)$$

All these functions are evaluated for the second camera 5 which shows the largest non-ambiguity depth, as depicted by block 67. A ROI (region of interest) is also evaluated, as depicted by block 68 over the depth of field of the virtual measurement volume, the phase value does not exceed a difference of $2\pi$ for every pixel, allowing a direct evaluation for m(i,j), the local order of the phase function. Using a LUT (look-up table), a low depth resolution 3D model is built and converted in real unit (mm), as depicted by block 69. The same functions are then evaluated for the first camera 3 which shows a small non-ambiguity depth, with multiple orders and highest depth resolution, as depicted by block 71. For every pixel of the first camera 3, a complete set of possible m(i,j) leads to a set of degenerated coordinates using a second LUT, as depicted by block 73. For example, if fifteen orders are possible for a given pixel in the calibrated depth of field, fifteen different coordinates are possible. Only one coordinate will be accepted, i.e. the one with correspondence with the second camera 5, as depicted by block 74, e.g. the low depth resolution 3D model. In various embodiment, all the mathematical functions and corresponding coordinates in real units give the same result within a tolerance range (such as the phase, phase shift, average and modulation function, color and distance). If no match is found, two different processes may occur. If the field of view of the second camera 5 is entirely covered by the first camera 3, the pixel without correspondence may be rejected as it may represent an out of ROI (region of interest) area. Otherwise, if the pixel is showing acceptable functions, it can be attached to the surrounding pixel using a local phase unwrapping technique. With the corrected order value and the current phase value, a 3D coordinate can be extracted from the first LUT. The group of rejected pixels defines an out of ROI (region of interest) area as depicted by block 72, within a shadow of the projection system, out of the virtual measurement volume or out of the dynamic range of the cameras (either too dark or saturated). The region of interest for the first camera 3 is evaluated using the region of interest for the second camera 5, as depicted by block 72. After this process, a complete 3D model of the subject with colored texture is built and ready to use (single view), as depicted by block 75.

Referring to FIG. 2, the above image processing may be implemented through the computer apparatus 77 provided with a processor (CPU) 80. A memory 81 connected to the processor 80 is usable to store the captured images and all other data involved during the process. The processor 80 and the memory 81 can be conveniently arranged to perform all the foregoing steps and operations of the process. The memory 81 may have recorded thereon statements and instructions for execution by the computer 77 to carry out the process. Thus, the computer 77 may conveniently provide all the means for performing the image processing of the images captured by the cameras 3, 5, i.e. for evaluating a same set of camera-projector related functions from the images captured by the cameras 3, 5, with at least some of the images including the pattern 34 projected at shifted positions 30, 31, 32, 33, for building the low depth resolution 3D model from the camera-projector related functions evaluated with respect to the second camera 5, for building the degenerated 3D model from the camera-projector related functions evaluated with respect to the first camera 3, for determining the chromatic texture from the images captured by the cameras 3, 5, and for building the complete textured 3D model from the data corresponding between the low depth resolution and degenerated 3D models within the chosen tolerance range.

The process may be embodied in a computer program product comprising the memory 81 having computer readable code embodied therein, for execution by the processor 80. On a practical level, the computer program product may be embodied in software enabling a computer system to perform the operations, described above in detail, supplied on any one of a variety of medias. An implementation of the approach and operations of the invention may be statements written in a programming language. Such programming language statements, when executed by a computer, cause the computer to act in accordance with the particular content of the statements. Furthermore, the software that enables a computer system to act in accordance with the invention may be provided in any number of forms including, but not limited to, original source code, assembly code, object code, machine language, compressed or encrypted versions of the foregoing, and any and all equivalents. The memory of the computer program product may take the form of a diskette, a tape, a compact disc, an integrated circuit, a ROM, a CD, a cartridge, a remote transmission via a communication circuit, or any other similar medium useable by computers. For example, to supply software for enabling a computer system to operate in accordance with the invention, the supplier might provide a diskette or might transmit the software in some form via satellite transmission, via a direct telephone link, or via the Internet. A carrier wave may embody a computer data signal representing sequences of statements and instructions which, when executed by a processor, cause the processor to perform the conversion process.

While embodiments of this invention have been illustrated in the accompanying drawings and described above, it will be evident to those skilled in the art that changes and modifications may be made therein without departing from the essence of this invention.

The invention claimed is:

1. An optical 3D digitizer with an enlarged non-ambiguity zone, comprising:
   at least one structured light projector for projecting a fringe pattern over a target area, the fringe pattern having a shiftable position over the target area;
   a first camera directed toward the target area and positioned with respect to said at least one structured light projector to define a first triangulation plane therewith;
   a second camera directed toward the target area and positioned with respect to said at least one structured light projector to define a second triangulation plane therewith, the second triangulation plane being distinct from the first triangulation plane, the first and second cameras having at least partially overlapping measurement fields, the second camera having a larger non-ambiguity depth than the first camera; and
   a computer means connected to the cameras, for performing an image processing of images captured by the cameras, the image processing including evaluating a same set of camera-projector related functions from images including the pattern projected by said at least one structured light projector at shifted positions as captured by the cameras, building a low depth resolution 3D model from the camera-projector related functions evaluated with respect to the second camera, building a degenerated 3D model from the camera-projector related functions evaluated with respect to the first camera, determining chromatic texture from the images captured by the cameras, and building a complete textured 3D model from data corresponding between the low depth resolution and degenerated 3D models within a tolerance range.

2. The optical 3D digitizer according to claim 1, wherein the fringe pattern has a periodic sinusoidal section profile.

3. The optical 3D digitizer according to claim 1, wherein the set of camera-projector related functions comprises relations determined from phase shifting algorithms used in phase shifting interferometry.

4. The optical 3D digitizer according to claim 1, wherein the set of camera-projector related functions comprises relations determined from spatial phase shifting algorithms relying on a single fringe image in temporal phase shifting interferometry.

5. The optical 3D digitizer according to claim 1, wherein the images captured by the cameras including the pattern projected by said at least one structured light projector are written as:

$$I_n(i,j)=I_{Ave}(i,j)+I_{Mod}(i,j)[1+\cos(\phi(i,j)+m(i,j)2\pi+(n-1)\alpha)]$$

where I represents one of the images, n represents a shift position of the pattern, i,j represent pixel coordinates in said one of the images, $I_{Ave}(i,j)$ represents a local intensity diffused or reflected back to the camera which captured said one of the images, including surrounding ambient light and local temporal average intensity of the pattern, $I_{Mod}(i,j)$ represents a local amplitude modulation of the pattern, φ(i,j) represents a local phase function wrapped over 2π range, m(i,j) represents a local order of the phase function, and α a represents a 90° phase shift.

6. The optical 3D digitizer according to claim 1, wherein the camera-projector related functions comprise a phase function, a phase-shift function, an amplitude modulation function and an average function.

7. The optical 3D digitizer according to claim 6, wherein the computer means evaluates the chromatic texture from the amplitude modulation function and the average function using separate color channels.

8. The optical 3D digitizer according to claim 6, wherein the computer means evaluates the set of camera-projector related functions using:

$$\varphi(i, j) = \text{invtan}((I_4(i, j) - I_2(i, j))/(I_1(i, j) - I_3(i, j)))$$

$$I_{Mod}(i, j) = \sqrt{(I_1(i, j) - I_3(i, j))^2 + (I_4(i, j) - I_2(i, j))^2}$$

$$I_{Ave}(i, j) = (I_1(i, j) + I_2(i, j) + I_3(i, j) + I_4(i, j))/4$$

$$\alpha(i, j) = 2 \cdot \text{invtan}\left(\sqrt{\frac{3(I_2(i, j) - I_3(i, j) - I_1(i, j) - I_4(i, j))}{(I_2(i, j) - I_3(i, j) + I_1(i, j) - I_4(i, j))}}\right)$$

where I represents one of the images, n represents a shift position of the pattern, i,j represent pixel coordinates in said one of the images, $I_{Ave}$ (i,j) represents a local intensity diffused or reflected back to the camera which captured said one of the images, including surrounding ambient light and local temporal average intensity of the pattern, $I_{Mod}$ (i,j) represents a local amplitude modulation of the pattern, φ(i,j) represents a local phase function wrapped over 2π range, and α represents a phase shift; and wherein a local order of the phase function m(i,j) is evaluated directly.

9. The optical 3D digitizer according to claim 8, wherein the computer means builds the low depth resolution and degenerated 3D models using look-up tables.

10. The optical 3D digitizer according to claim 1, wherein the image processing includes comparing the camera-projector related functions of the cameras and pixel coordinates in the images captured by the cameras, determining rejection of pixels without correspondences if a field of view of the second camera is entirely covered by the first camera, attaching pixels showing acceptable functions to surrounding pixels by local phase unwrapping, and extracting 3D coordinates forming the complete textured 3D model using table data for building the low depth resolution 3D model applied to corrected order values and current phase values.

11. A computer apparatus for performing an image processing of images captured by first and second cameras, the second camera having a larger non-ambiguity depth than the first camera, comprising:
   means for evaluating a same set of camera-projector related functions from images captured by the cameras, at least some of the images including a pattern projected at shifted positions;
   means for building a low depth resolution 3D model from the camera-projector related functions evaluated with respect to the second camera;
   means for building a degenerated 3D model from the camera-projector related functions evaluated with respect to the first camera;
   means for determining chromatic texture from the images captured by the cameras; and
   means for building a complete textured 3D model from data corresponding between the low depth resolution and degenerated 3D models within a tolerance range.

12. A computer readable medium having recorded thereon statements and instructions for execution by a computer to perform an image processing of images captured by first and second cameras directed toward a target area, the second camera having a larger non-ambiguity depth than the first camera, the image processing including evaluating a same set of camera-projector related functions from the images captured by the cameras, at least some of the images including a pattern projected at shifted positions, building a low depth resolution 3D model from the camera-projector related functions evaluated with respect to the second camera, building a degenerated 3D model from the camera-projector related functions evaluated with respect to the first camera, determining chromatic texture from the images captured by the cameras, and building a complete textured 3D model from data corresponding between the low depth resolution and degenerated 3D models within a tolerance range.

13. A computer program product, comprising a memory having computer readable code embodied therein, for execution by a CPU, for performing an image processing of images captured by first and second cameras directed toward a target area, the second camera having a larger non-ambiguity depth than the first camera, said code comprising:
   code means for evaluating a same set of camera-projector related functions from the images captured by the cameras, at least some of the images including a pattern projected at shifted positions;
   code means for building a low depth resolution 3D model from the camera-projector related functions evaluated with respect to the second camera;
   code means for building a degenerated 3D model from the camera-projector related functions evaluated with respect to the first camera;
   code means for determining chromatic texture from the images captured by the cameras; and
   code means for building a complete textured 3D model from data corresponding between the low depth resolution and degenerated 3D models within a tolerance range.

14. An optical 3D digitizer with an enlarged non-ambiguity zone, comprising:
   at least one structured light projector projecting a fringe pattern over a target area, the fringe pattern having a shiftable position over the target area;
   a first camera directed toward the target area and positioned with respect to said at least one structured light projector to define a first triangulation plane therewith;
   a second camera directed toward the target area and positioned with respect to said at least one structured light projector to define a second triangulation plane therewith, the second triangulation plane being distinct from the first triangulation plane, the first and second cameras having at least partially overlapping measurement fields, the second camera having a larger non-ambiguity depth than the first camera; and
   a computing device, connected to the cameras, being programmatically configured to i) evaluate a same set of camera-projector related functions from images including the pattern projected by said at least one structured light projector at shifted positions as captured by the cameras, ii) build a low depth resolution 3D model from the camera-projector related functions evaluated with respect to the second camera, iii) build a degenerated 3D model from the camera-projector related functions evaluated with respect to the first camera, iv) determine chromatic texture from the images captured by the cameras, and v) build a complete textured 3D model from data corresponding between the low depth resolution and degenerated 3D models within a tolerance range.

15. A computing device for performing image processing of images captured by first and second cameras, the second camera having a larger non-ambiguity depth than the first camera, wherein the computing device includes a software program which when executed in the computing device i) evaluates a same set of camera-projector related functions from images captured by the cameras, at least some of the images including a pattern projected at shifted positions, ii) builds a low depth resolution 3D model from the camera-projector related functions evaluated with respect to the second camera, iii) builds a degenerated 3D model from the camera-projector related functions evaluated with respect to the first camera, iv) determines chromatic texture from the images captured by the cameras, and v) builds a complete textured 3D model from data corresponding between the low depth resolution and degenerated 3D models within a tolerance range.

* * * * *

UNITED STATES PATENT AND TRADEMARK OFFICE
CERTIFICATE OF CORRECTION

PATENT NO. : 7,274,470 B2
APPLICATION NO. : 10/898504
DATED : September 25, 2007
INVENTOR(S) : Lemelin et al.

Page 1 of 1

It is certified that error appears in the above-identified patent and that said Letters Patent is hereby corrected as shown below:

On the Title page, in column 1, under Title, line 2, delete "NO-AMBIGUITY" and insert -- NON-AMBIGUITY --, therefor.

In column 1, under Title, line 2, delete "NO-AMBIGUITY" and insert -- NON-AMBIGUITY --, therefor.

In column 10, line 10, delete "(n=1)" and insert -- (n-1) --, therefor.

In column 10, line 22, after "and" delete "a" an insert -- α --, therefor.

In column 12, line 60, in Claim 5, delete "(n=1)" and insert -- (n-1) --, therefor.

Signed and Sealed this

First Day of July, 2008

JON W. DUDAS
*Director of the United States Patent and Trademark Office*